Oct. 31, 1950   H. KERSHAW ET AL   2,528,060
COFFEE-MAKING APPARATUS
Filed Oct. 8, 1945   2 Sheets-Sheet 1
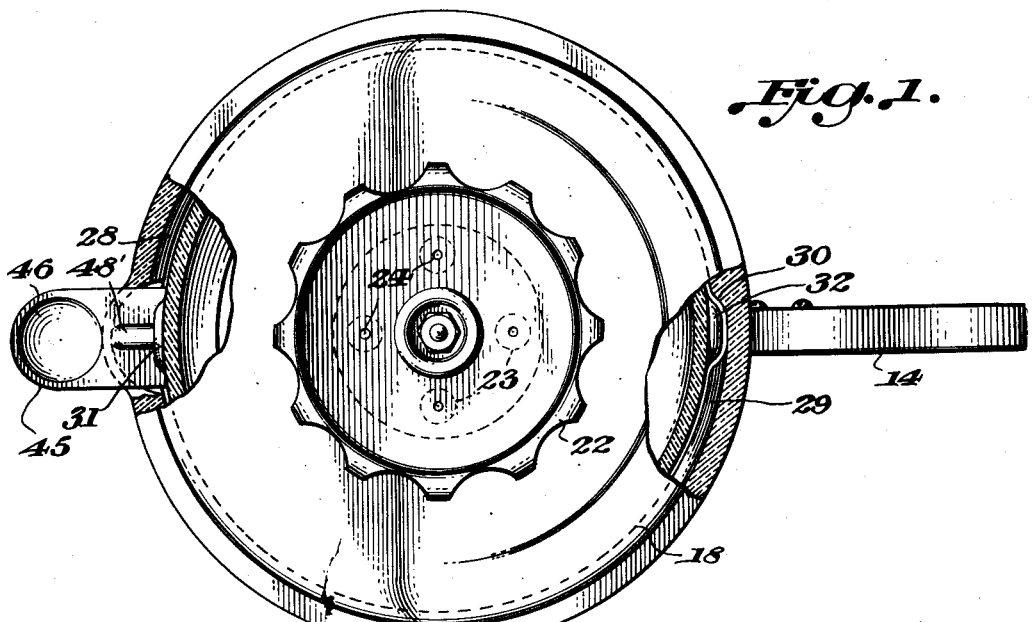
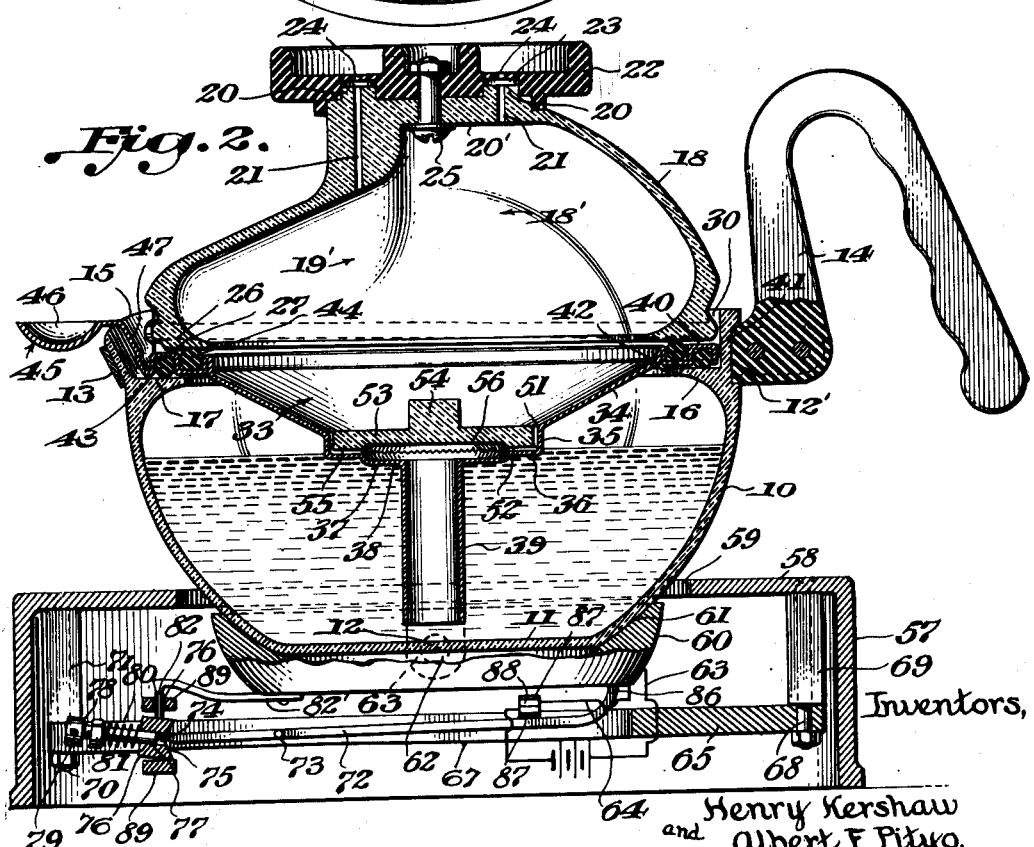
Inventors,
Henry Kershaw
and Albert F Pityo, Oct. 31, 1950  H. KERSHAW ET AL  2,528,060
COFFEE-MAKING APPARATUS
Filed Oct. 8, 1945  2 Sheets-Sheet 2

Inventors,
Henry Kershaw
and Albert F. Pityo.
By [signature] atty.

Patented Oct. 31, 1950

2,528,060

UNITED STATES PATENT OFFICE 2,528,060

COFFEE-MAKING APPARATUS

Henry Kershaw, Belleville, and Albert F. Pityo, Clifton, N. J.

Application October 8, 1945, Serial No. 621,034

5 Claims. (Cl. 99—281)

Our invention relates to a coffee making apparatus.

An important object of the invention is to provide means to automatically cut off the source of heat when a selected amount of the water has passed from the lower receptacle into the upper receptacle.

A further object of the invention is to provide an upper receptacle so shaped that the weight of the water held in a portion thereof is eccentric with respect to the center of the upper receptacle, whereby the coffee making apparatus will tilt when the water passes from the lower receptacle into the upper receptacle.

A further object of the invention is to provide means to support the apparatus in the upright position when its weight is balanced and to allow the same to tilt when its weight is unbalanced.

A further object of the invention is to provide a pivoted support operating in conjunction with a snap switch, which opens the circuit to an electrical heating unit, when the support swings.

A further object of the invention is to provide an adjustable snap switch which will operate at different pressures, depending upon the degree of the unbalanced weight of the apparatus.

Other objects and advantages of the invention will be apparent during the course of the following description.

Figure 3:
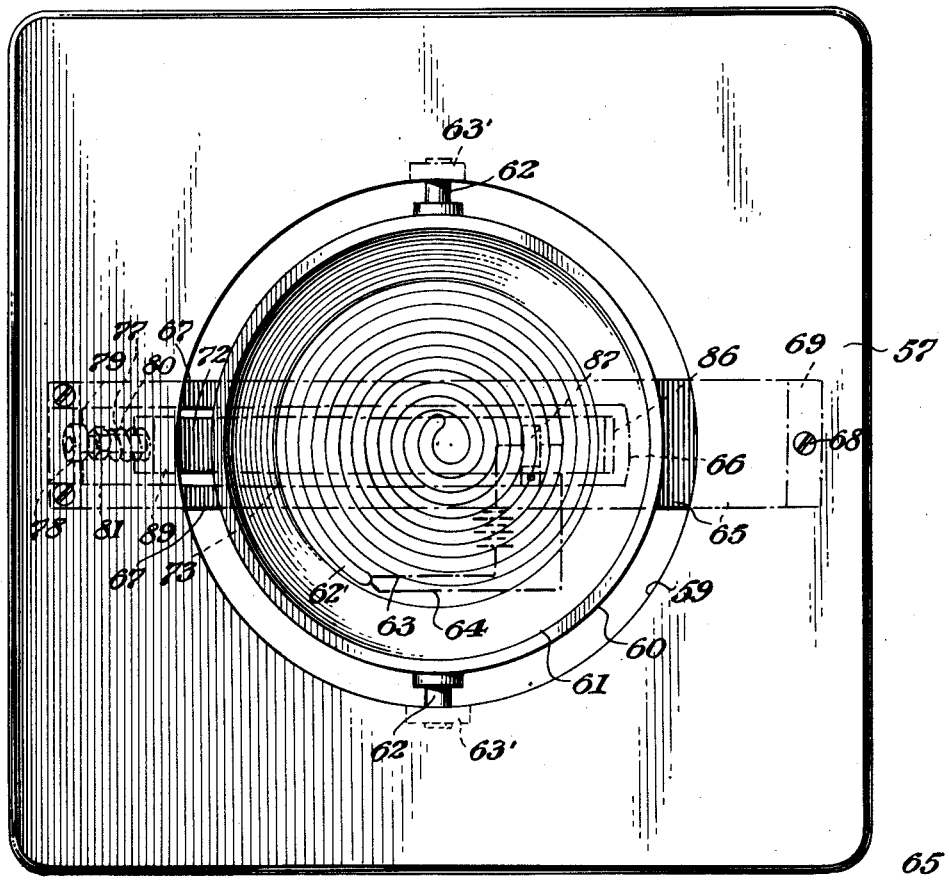
Figure 4:
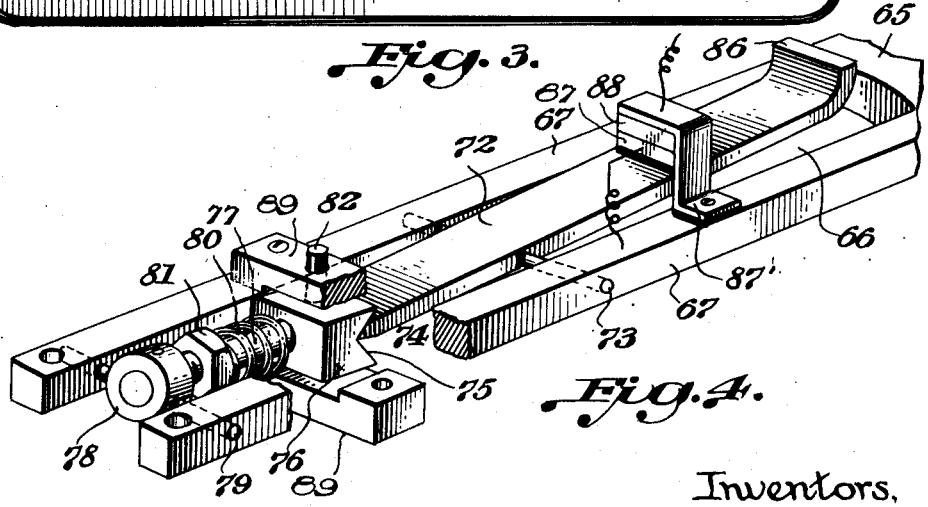

In the accompanying drawings forming a part of this application and in which like numerals are employed to designate like parts throughout the same, Figure 1 is a plan view of the coffee making unit embodying our invention, Figure 2 is a central vertical longitudinal section through the coffee making unit and the electrical heating unit, Figure 3 is a plan view of the electrical heating unit, the coffee making unit being removed, and Figure 4 is a perspective view of the snap switch.

In the drawings, wherein for the purpose of illustration is shown a preferred embodiment of our invention, the numeral 10 designates a lower receptacle, which is preferably cup-shaped and circular in horizontal cross section and tapering downwardly, and having a flat bottom 11. This lower receptacle may be formed of glass or any other suitable material. The side of this lower receptacle tapers downwardly in a uniform manner and the weight of the water contained in the receptacle 10 is concentric with the center 12 of the bottom 11. When the receptacle is pivotally supported to turn about an axis in alignment with the center 12, the weight of the water within the receptacle 10 is always balanced regardless of the elevation of the water within the receptacle. Near its upper end, the receptacle has a horizontal groove 12', receiving a metal band 13, the ends of which are attached to a handle 14, formed of heat insulating material. Diametrically opposite the handle 14, the lower receptacle is provided with a spout 15, as shown. Arranged near the top of the receptacle 10 and at an elevation spaced below the top, is an internal flange 16, formed integral with the receptacle. This flange is annular and provides a horizontal shoulder or face 17.

Arranged above the lower receptacle is an upper receptacle 18, which is preferably generally inverted cup-shaped, and tapering upwardly. This upper receptacle may be formed of glass or any suitable material. Substantially one-half 18' of the upper receptacle 18 is substantially spherically curved while its remaining half 19' is pressed in at the top, as shown. The spherically curved portion 18' therefore forms a chamber portion considerably larger than the chamber portion formed by the portion 19'. When the water rises in the upper receptacle above its bottom, the weight of the water becomes eccentric with respect to the center of the upper receptacle 18 and their center 12, and this eccentric weight increases as the elevation of the water rises within the upper receptacle. At its top, the upper receptacle has a flat portion 20', carrying upstanding lugs 20, having vent apertures 21. Arranged upon the flat portion 20, is a nob or handle 22, preferably formed of heat insulating material, such as "Bakelite." This nob or handle has recesses 23 for receiving the lugs 20 and vent apertures 24 in communication with the vent apertures 21. The nob or handle is attached to the flat portion 20' by a bolt 25. The lugs 20 prevent the nob or handle 22 from turning with relation to the upper receptacle 18. The upper receptacle is cylindrical at its bottom, forming an internal flange 26 having a lower flat horizontal face or shoulder 27.

The lower receptacle is provided near its upper end and above the shoulder 17 with internal circumferentially extending grooves 28 and 29, which are suitably inclined in opposite directions, like a screw thread. The spout 15 forms a vertical passage, open at its top and leading into the groove 28, while the lower receptacle has a vertical passage 30, open at its top and leading to the groove 29. The upper receptacle 18 is provided near and above the shoulder 27 with ribs or lugs 31 and 32, to be moved downwardly through the spout 15 and passage 30, respectively, and to enter the grooves 28 and 29. When the upper receptacle is applied to the lower receptacle 10, as shown in Figure 2, and the upper receptacle turned clockwise, the ribs 31 and 32 will enter the grooves 28 and 29, and the upper receptacle will be drawn down upon the lower receptacle and securely attached thereto. The lower receptacle is substantially open at its top and has a large opening and the upper receptacle is substantially open at its bottom or has a large opening, and this will facilitate the cleaning of the receptacle. The numeral 33 designates a tube carrying unit which may be formed of sheet metal or the like. The unit 33 includes a bowl-shaped imperforate portion 34, having a cylindrical portion or chamber 35 formed upon its lower reduced end, and the chamber has a bottom 36, which is horizontal, and is formed to produce an annular depressed portion 37, providing an annular space 38. The portion 37 has a vertical depending tube 39, secured thereto. The elements 34, 35, 36, 37 and 39 are integral and concentric. At its top, the bowl-shaped portion 34 has its material formed to provide a horizontal annular flange 40, and this flange is bent or formed to provide downwardly and upwardly facing U-shaped annular sockets or holding members 41 and 42. A resilient packing ring 43 is held within the annular socket 41 and projects downwardly below the same, while a resilient packing ring 44 is held within the annular socket 42 and projects upwardly beyond the same. These packing rings are formed of rubber or the like and are preferably circular in cross section.

The bowl-shaped portion 34 has a handle 45, preferably formed integral with the flange 40. This handle has an upper recess 46 for receiving the thumb and includes a vertically inclined shank 47, to enter the spout 15. This shank is stiffened or reinforced by a longitudinal rib 48', formed thereon, as shown.

Straining means are provided, to permit of the passage of the water from the lower receptacle into the upper receptacle and to prevent the passage of the ground coffee into the lower receptacle. To accomplish this, the chamber or cylindrical portion 35 is provided upon its periphery with fine vertical internal grooves 51, open at their tops and having their lower ends leading into fine horizontal grooves 52, formed upon the upper face of the bottom 36. These grooves are preferably V-shaped in cross section and may have a maximum width as small as .010 inch, although their size may vary considerably. They should be sufficiently small or fine to prevent the ground coffee from passing through them and their size may vary depending upon the degree of fineness that the coffee to be treated is ground. The construction of the cylindrical portion 35 and grooves 51 and 52 is identical with the construction shown and described in our co-pending application for Coffee Making Apparatus, filed July 11, 1945, Serial No. 604,450, which issued as Patent No. 2,489,785, November 29, 1949. Adapted for insertion within the cylindrical portion or chamber 35 is a cylindrical disc 53, having an upstanding nob 54. This disc is preferably formed of glass and is held in place by gravity or by frictional engagement with the cylindrical portion of the chamber 35. The disc 53 has a lower flat face 55 to be arranged over the lower horizontal bottom 36 and cover the tops of the horizontal grooves 52. The disc 53 is provided upon its lower face with a circular recess 56. The construction of this disc is identical with that shown and described in our said co-pending application.

The present invention is not restricted to the precise form of straining means shown including the grooves 51 and 52 and disc 53, as the ordinary fabric strainer may be used, or any other suitable material.

An electrical heating unit is provided for use in connection with the coffee making unit, comprising a hollow base 57 which may be formed of metal or the like and including a horizontal top 58, having a large central circular opening 59. Arranged within the base 57 is a circular support 60, provided in its top with a tapered recess 61, circular in cross section, to receive the lower end of the receptacle 10. This support is provided at diametrically opposite points with trunnions 62, pivoted within depending knuckles or bearings 63', formed integral with the top 58. These trunnions or bearings are in vertical alignment with the center of the support 60 and the center 12 of the bottom 11. The support 60 is therefore pivotally supported to swing in a vertical plane about the trunnions 62 and the support 60 is balanced and will therefore assume a horizontal position, when released. The support 60 is formed of metal which is a good conductor of heat, such as copper, while the invention is not restricted to this particular metal.

Mounted within and insulated from the pivoted support 60 is an electrical heating unit or resistance 62' of any well known or preferred type, and wires 63 and 64 are connected with the opposite terminal or terminals of this resistance element.

A trip switch is arranged within the base 57 below the pivot support 60 and this trip switch comprises a bar 65, having a longitudinal opening 66, forming arms 67. This bar is horizontal and one end of the bar is rigidly attached to the top 58 by a bolt 68 passing through a spacer 69. The free ends of the arms 67 are attached to the top 58 by bolts 70, passing through a spacer 71. Mounted within the opening 66 is a vertical swinging lever or arm 72, which is pivoted near and spaced from one end upon a pin 73, carried by the arms 67. The lever 72 is free to swing vertically. At one end, the lever 72 has a knife edge 74, to engage within a V-shaped recess 75 of a block 76. This block is slidably mounted upon a rod 77. This rod is rigidly attached to a head 78, pivotally mounted upon a pin 79, carried by the arms 67. The rod 77 is pivoted to swing in a vertical plane and in the plane of swinging movement of the lever 72. A compressible coil spring 80 surrounds the rod 77 and engages the sliding block 76 and an adjusting nut 81, having screw threaded engagement with the rod 77. Any suitable means may be employed to lock the nut 81 in the selected adjusted position. Arranged near and above the rod 77 is a vertical push rod 82. This push rod is employed to reset the lever 72 by engaging the block 76. At its opposite end, the lever has an upwardly bent or extending portion 86, arranged to engage the pivoted support 60, near its marginal edge and remote from the trunnions 62.

A contact 87 is mounted upon the lever 72 and insulated therefrom and this contact is arranged to engage a companion contact 88, mounted upon a bracket 87', attached to the arm 67 and insulated therefrom. When the upturned end of the lever 72 is in the raised position, contact 87 will engage contact 88, but when this upturned end is tripped downwardly, contact 87 will disengage contact 88. The upward and downward movement of the lever 42 is limited by stationary stops 89, rigidly attached to the arms 67 and preferably formed of fiber. The push rod 82 slides in an opening in the upper stop 89 and is depressed by an arm 82' rigidly attached to the support 60.

The wire 63 is connected with the contact 87, while the wire 64 is connected with the contact 88. The wire 63 has connection with a suitable source of current.

The operation of the apparatus is as follows:

The assembled upper and lower receptacles 10 and 18, when empty, and associated elements, when placed upon the pivoted support 16, will be substantially balanced. These empty receptacles cannot overcome the action of the spring 80 and trip the upwardly extended end 86 of the lever 72 downwardly. Before the lower receptacle 10 is placed upon the pivoted support 60, the desired amount of water is introduced into the receptacle and the unit 33 is placed in position within the receptacle 10. The ground coffee is placed within the bowl-shaped portion 34 and the upper receptacle 18 is then applied to the lower receptacle and turned with relation thereto. This connects the upper and lower receptacles and forms a steam-tight joint between them. The lever 72 now has its upturned end elevated and engages the pivoted support 60. The receptacle 10 is now placed within the recess 61, the portion 18' being arranged next to the upstanding end 86 and the handle 14 extending parallel with the longitudinal axis of the lever 72. The circuit is now closed and the resistance element 62 provides the heat to boil the water within the receptacle 10. As pressure develops within the top of the receptacle 10, the water is forced upwardly through the tube 39 and the straining means and enters the upper receptacle. When the water is in the bottom of the upper receptacle, the weight of the water is still balanced with respect to the trunnions 62. As the water rises in the upper receptacle, the weight of the water becomes unbalanced and this unbalanced weight increases as the water continues to rise in the upper receptacle. When a sufficient amount of water has entered the upper receptacle, the unbalanced weight of the water tips the receptacles 10 and 18 and the support 60 upon the trunnions 62, as the unbalanced force overcomes the action of the spring 80 and the upturned end of the lever 72 swings or snaps downwardly. This causes contact 87 to disengage contact 88 and the circuit is opened and the current cut off from the resistance element 62'. The lever 72 may have its upturned end tripped downwardly when all of the water within the receptacle 10 enters the receptacle 18 or when the water rises in the receptacle 18 to any selected level. The unbalanced weight to trip the upturned end of the lever 72 downwardly may be regulated by adjusting the nut 81, which controls the compression of the spring 80. If the circuit is opened before all of the water in the lower receptacle 10 enters the upper receptacle, there will ordinarily be sufficient pressure to complete the forcing of the water into the upper receptacle. With the current cut off, the pressure is lowered in the lower receptacle 10 and a vacuum created therein, and the water is returned to the lower receptacle by the action of gravity and suction. The coffee making unit may be removed from the pivoted support 60 and manipulated for pouring the coffee. This is effected by moving the upper receptacle 18 from the lower receptacle and removing the unit 33. The coffee may be poured through the spout 15.

While we have shown and described our coffee making apparatus for use in connection with an electrically operated heating device, yet the invention is not necessarily restricted to such a device. Other heating means, such as a gas burner, may be substituted for the electrical heating unit and the movement of the lever 72 employed to cut off or lower the gas.

When it is desired to again use the electrical heating unit, the push rod 82 is depressed, which will again trip the upturned end of the lever 72 to the raised position, closing the circuit for the heating unit 62'. The push rod 82 is depressed by returning the support to the horizontal position.

It is to be understood that the form of our invention herein shown and described is to be taken as a preferred example of the same and that various changes in the shape, size and arrangement of parts may be resorted to without departing from the spirit of our invention or the scope of the subjoined claims.

Having thus described our invention, what we claim is:

1. A coffee making apparatus, comprising a pivoted support, an electrical heating unit, a lower receptacle to be mounted upon the pivoted support, an upper receptacle carried by the lower receptacle and so shaped that the weight of the volume of water held in a portion of the upper receptacle is unbalanced with respect to the center of the upper receptacle, means to cause the water to pass from the lower receptacle into the upper receptacle when pressure is generated in the lower receptacle, a pivoted lever having a part to engage with the pivoted support, a pivoted member arranged near one end of the pivoted lever, an element mounted upon the pivoted member to move longitudinally thereof and engaging the end of the pivoted lever, a spring to move the element toward the pivoted lever, and circuit closing means for controlling the supply of current to the electrical heating unit and operated by the pivoted lever.

2. A coffee making apparatus, comprising a pivoted support, a lower receptacle to be mounted upon the pivoted support, an upper receptacle carrier by the lower receptacle and having one side portion larger than its oppositely arranged side portion, means to cause the water to pass from the lower receptacle into the upper receptacle when pressure is generated in the lower receptacle, an electrical heating unit for the lower receptacle, a pivoted lever having a part to engage the pivoted support, a pivoted member arranged near one end of the pivoted lever, an element slidably mounted upon the pivoted member and engaging the end of the lever, a spring engaging the element to move it toward the end of the lever, adjustable means to regulate the tension of the spring, and circuit closing means connected with the electrical heating unit and operated by the lever.

3. A coffee making apparatus, comprising a base, a normally substantially horizontal support, means to pivotally mount the support upon the base so that the moments of the support upon opposite sides of the pivot means are substantially equal and the support is substantially balanced, a lower receptacle mounted upon the support and so shaped that the combined moments of the receptacle and its water upon opposite sides of the pivot means are substantially equal, a separate upper receptacle removably mounted upon the lower receptacle and so shaped that the combined moments of such upper receptacle and its water upon opposite sides of the pivot means are unequal when the water rises in the upper receptacle, means to cause the water to pass from the lower receptacle to the upper receptacle, a lever pivoted upon the base and having a part engaging the support, resilient means engaging the lever to trip the same to the end of its movement in either direction when one end of the lever is moved past dead center, a switch device operated by the lever and opened when the lever is swung in one direction by the support, means operated by the support for shifting the lever in an opposite direction, and electrical heating means for the lower receptacle having its operation controlled by the switch device.

4. A coffee making apparatus, comprising a normally substantially horizontal support, means for pivotally supporting said support so that the moments of the support upon opposite sides of the pivot means are substantially equal, a lower water receiving receptacle mounted upon the support and so shaped that the combined moments of the receptacle and its water upon opposite sides of the pivot means are substantially equal, a separate upper water receiving receptacle removably mounted upon the lower receptacle and so shaped that the combined moments of such upper receptacle and its water upon opposite sides of the pivot means are unequal when the water rises in the upper receptacle, means to cause the water to pass from the lower receptacle into the upper receptacle when the lower receptacle is heated, a vertically swinging pivoted lever engaging the support upon one side of the pivot means so that the support shifts the lever in one direction, a member engaging the support upon the opposite side of its pivot and serving to swing the lever in an opposite direction, a switch device operated by the lever and electrical heating means for the lower receptacle having its operation controlled by the switch device.

5. A coffee making apparatus, comprising a support, means for pivotally supporting said support so that the moments of the support upon opposite sides of the pivot means are substantially equal, a lower water receiving receptacle mounted upon the support and so shaped that the combined moments of the receptacle and its water upon opposite sides of the pivot means are substantially equal, a separate upper water receiving receptacle removably mounted upon the lower receptacle and so shaped that the combined moments of such upper receptacle and its water upon opposite sides of the pivot means are unequal when the water rises in the upper receptacle, means to cause the water to pass from the lower receptacle into the upper receptacle when the lower receptacle is heated, a vertically swinging pivoted lever engaging near one end with the support upon one side of the pivot means, a resilient device engaging the opposite end of the lever to trip the same to the end of its movement in either direction when such end is moved past dead center, a member engaging the support and extending upon the opposite side of the pivot means and serving to swing the last named end of the lever from the support, a switch device operated by the lever, and an electrical heating means for the lower receptacle having its operation controlled by the switch device.

HENRY KERSHAW.
ALBERT F. PITYO.

REFERENCES CITED

The following references are of record in the file of this patent:

UNITED STATES PATENTS

| Number | Name | Date |
| --- | --- | --- |
| 74,937 | Petsch | Feb. 25, 1868 |
| 434,822 | Doty | Aug. 19, 1890 |
| 1,287,378 | Malcamp | Dec. 10, 1918 |
| 1,816,994 | Armstrong | Aug. 4, 1931 |
| 1,831,013 | Kouyounijian | Nov. 10, 1931 |
| 2,181,090 | Lucia | Nov. 21, 1939 |
| 2,385,694 | Davis | Sept. 25, 1945 |
| 2,402,163 | Huenergardt | June 18, 1946 |
| 2,458,640 | Reichold | Jan. 11, 1949 |